3,067,100
ANTIBIOTIC MELANOMYCIN
Toju Hata, 745 1-chome, Nakameguro, Meguro-ku; Ryozo Sugawara, 9 Konno-cho, Shibuya-ku; Akihiro Matsumae, 2787 Shimofuda-machi, Chofu-shi; and Yoshimoto Sano, 732 4-chome Sendagaya, Shibuya-ku, all of Tokyo, Japan
No Drawing. Filed Sept. 13, 1957, Ser. No. 683,690
Claims priority, application Japan Oct. 3, 1956
5 Claims. (Cl. 167—65)

This invention relates to a new and useful protein-like substance, called melanomycin, and its metal and acid addition salts and to processes for their production. More particularly, it relates to processes for the production of melanomycin by fermentation and to methods for its recovery and purification. The invention embraces melanomycin and its salts in dilute solutions, as crude concentrates, as purified solids and in pure crystalline form. These agents are effective, e.g. as one percent aqueous solutions, in inhibiting the growth of certain bacteria. They are also antitumor agents, e.g. they inhibit the proliferation of Ehrlich carcinoma cells and HeLa cells and prolong the lives and improve the condition of animals inoculated with such cells. They have not yet been demonstrated to be useful in the cure or alleviation of cancer in humans.

There is now provided according to the present invention a member selected from the group consisting of a brown protein-like amphoteric substance, melanomycin, which is sparingly soluble in water at pH 2 to 5 but soluble in water at pH 6 to 9, is insoluble in organic solvents, does not pass through a semipermeable membrane upon dialysis, exhibits essentially no maxima of absorption of ultra-violet light between 270 and 330 m$\mu$, exhibits negative biuret, ninhydrin, Fehling and Sakaguchi reactions and positive diazo, xanthoprotein, Millon and nitroprusside reactions, is decolorized by bromine, chlorine, potassium permanganate and hydrogen peroxide, yields on acid hydrolysis phenylalanine, leucine, valine, proline, lysine, arganine, alanine, glutamic acid and histidine but not tyrosine and exhibits an isoelectric point between pH 2 and 4; and metal and acid addition salts thereof.

There is further provided, according to the present invention a process for producing melanomycin which comprises cultivating a strain of *Streptomyces melanogenes* in an aqueous carbohydrate solution containing an organic nitrogenous nutrient under submerged aerobic conditions for at least twelve hours.

The organism producing the melanomycin of the present ivention was isolated from a sample of soil collected at Komaba, Setagaya-ku in Tokyo-to and is a new species, designated *Streptomyces melanogenes*, Sugawara, of the genus Streptomyces. A culture of each of two strains of the living organism isolated from soil and given the laboratory designation V1179 has been deposited with the American Type Culture Collection, Washington, D.C., and added to its permanent collection of microorganisms as A.T.C.C. 12851 and 12852 respectively.

*Streptomyces melanogenes* has the following characteristics:

(1) Morphological characteristics: Under the microscope, the aerial mycelia of *Streptomyces melanogenes* grown on synthetic media are linear and sometimes slightly curved. No verticillate branch nor spiral structure is observed. Spores are cylindrical and 1.7–0.8 micron by 0.5 micron in size.

(2) Characteristics on differentiation media: As shown in Table 1, this species produces brown soluble pigment when cultured on media which contain organic nitrogen. This nature is not lost after transplantations. Taxonomically, this species belongs to the chromogenic group. The relatively strong reproducibility of reddish brown to greenish brown pigment, which was observed soon after isolation on synthetic media such as synthetic agar medium, glucose-asparagine agar medium, and tyrosine agar medium, was lost by transplantations.

The aerial mycelium is powdery or cottony and essentially white. Later, it becomes brownish, greyish or yellowish white. This nature is not changed by transplantations. The morphology and the color characterizes this species. The mycelium is essentially brown, and has greyish to reddish tone. Mycelium has strong reddish tone esepically on synthetic agar medium, but red is not characteristic of this species. However, bluish to greenish tone of the growth on calcium malate agar, Löffler's serum agar, peptone-asparagine-glucose agar (pH 8.0), Emerson's agar and potato-glucose agar is characteristic, and is not lost by transplantations. Especially on calcium malate agar, the growth is nearly black, and this characterizes this species second to morphology and color of aerial mycelium. The shape of the colonies is not so characteristic, except that double-ring elevated colonies are formed on Emerson's agar and glucose-nutrient agar.

(3) Physiological characteristics: In proteolytic action, ability to liquify gelatin is weak, but liquefaction of serum medium and hemolysis of blood agar are remarkable. The details are indicated in Table 2. The sugar utilization is shown in Table 3. Among strains isolated by the present inventors, this species is a rare one which utilizes xylose and raffinose, but not rhamnose.

(4) Differentiation from somewhat similar species: With particular attention to differentiation based on the morphology and color of the aerial mycelia and on the color tone of mycelia and synthetic media, especially of the growth on calcium malate agar, and also on the pigment production and other physiological natures on organic nitrogen-containing media, the difference between this species and somewhat similar species was investigated.

From *Streptomyces phaeochromogenes*: The present species is differentiated by the black color of the growth and the spiral structure of aerial mycelium on synthetic agar medium, and by the cream color of the growth on calcium malate agar, though this species resembles *Streptomyces phaeochromogenes* in color tone of the aerial mycelium on synthetic medium, the color of the growth on gelatin, the change of milk medium, and the pigment-producibility.

From *Streptomyces griseocarneus*: The present species is differentiated by the physiological natures, though the morphology and color of them resemble each other. *Streptomyces griseocarneus* does not liquefy nor peptonize milk medium, liquefies gelatin, and does not reduce nitrate. The color of the growth on calcium malate agar is also different.

From *Streptomyces roseochromogenes*: The present species is differentiated by spiral structure and rose-color tone of the aerial mycelium and different change of milk medium. But they resemble each other in the characteristics of color of the growth, namely, reddish growth on synthetic medium, and bluish to greenish growth on calcium malate agar, potato-glucose agar and Emerson's agar.

From *Streptomyces cinnamonensis*: The present species is differentiated by the growth of white to cream-color, non-liquefaction of Löffler's serum medium, non-coagulation of milk, no reduction of nitrate, and weak production of soluble pigment, but they resemble each other to some extent in the morphology and color tone of the aerial mycelium. Although they are characterized by the rose-color of their aerial mycelia, it is difficult to attach importance to brownish tone in white aerial mycelium of *Streptomyces melanogenes*.

From *Streptomyces carzinomycicus* and *Streptomyces*

*kitazawaensis:* The difference was especially well investigated, because they produce somewhat similar substances. The detail is shown in Table 4. The present species resembles *Streptomyces carzinomycicus* chiefly in pigment-production. The present species agrees with *Streptomyces kitazawaensis* in morphology and color of aerial mycelia and utilization of rhamnose, raffinose and xylose. The morphology and structure of the aerial mycelium are an important difference from *Streptomyces carzinomycicus*, and the cultural characteristics on synthetic agar medium and calcium malate agar medium are an important point of difference from *Streptomyces kitazawaensis*. The present species can thus be differentiated from these species.

*Streptomyces melanogenes* is considered to be most similar to the *Streptomyces phaeochromogenes* or *Streptomyces griseocarneus* groups, but, as described above, *Streptomyces melanogenes* shows striking contrasts to these species, and it was concluded to be a new Streptomyces species.

TABLE 2
Biological Characteristics

1. Proteolytic action: Hemolysis, positive. Loffler's serum agar, liquified completely and rapidly. Gelatin stab, slowly liquified. Milk medium, coagulated rapidly, peptonized slowly.
2. pH change:

| | 1 week | 2 weeks | 3 weeks |
|---|---|---|---|
| Milk medium | 6.0 | 7.4 | 8.5 |
| Glucose-nutrient broth | 5.0 | 7.4 | 7.8 |

3. Starch hydrolysis: Remarkable.
4. Nitrite production: Remarkable.
5. Cellulose dissolution: No (by filter paper).
6. Tyrosinase production: No.

TABLE 3
Sugar Utilization

| | | | | | | | |
|---|---|---|---|---|---|---|---|
| Xylose | + | Rhamnose | − | Raffinose | + | Arabinose | + |
| Lactose | + | Trehalose | + | Mannitol | + | Sucrose | + |
| Salicin | − | Inositol | + | Glucose | + | Maltose | + |
| Mannose | + | Glycerol | + | Dextrin | + | Fructose | + |
| Starch | + | Galactose | + | Sorbitol | + | Esculin | − |
| Inulin | − | Na acetate | ± | Na citrate | ± | Na succinate | ± |

NOTE.—(1) Synthetic liquid medium is used as basal medium. (2) Observation was made for 3 weeks.

TABLE 1
Cultural Findings on Differentiation Media

| Media | Growth | Aerial mycelium | Soluble pigment |
|---|---|---|---|
| Synthetic agar | Wet, wrinkled, diffuse, colorless to reddish-brown with greyish tinge. Reverse; orange color. | Thin, powdery to cottony, brownish white. | Brownish yellow (yellowish brown with reddish tinge). |
| Glucose asparagine agar | Wet, glossy, colorless to cream-color; center dark red. Reverse; dark orange-color. | Thin; center cottony, pale greyish white. | Light yellowish brown (yellowish brown). |
| Starch agar | Colorless, yellowish brown to dark brownish grey. Reverse; dark yellowish orange-color. | Thick, powdery to cottony, yellowish brown to pinkish white. | Light yellowish brown (light olive color). |
| Calcium malate agar | Sporadic colonies. Thin, center idented, circumference thin. Colorless brownish yellow, reddish brown with greyish tinge or bluish black with greyish tinge. | White with yellow tinge. | Light yellowish brown (yellowish brown with greenish tinge). |
| Tyrosine agar | Wet, spotted colonies, glossy, elevated. Colorless, grey to yellowish brown. | Cottony white with brownish tinge. | Light brownish yellow (light olive yellow). |
| Nutrient agar | Spotted colonies, glossy, weakly diffused into medium. Colorless, cream color, brownish grey to brown. | None. | Reddish brown. |
| Glucose-nutrient agar | Spotted colonies, wrinkled. Colorless, grey to light yellowish brown. Reverse; dark yellowish orange color. | ...do... | Do. |
| Peptone-Asparagine-glucose-agar (pH 5.0) | Wet, center elevated. Cream color, greyish brown to dark brown. | Greyish white to pinkish white. | None. |
| Peptone-Asparagine-glucose-agar (pH 8.0) | Center elevated. Bluish green (dark yellow orange color). | Brownish white. | Light brownish yellow. |
| Emerson's agar | Colorless, grey to light olive color or light brown. | Thin, white, partly greyish white. | Brown. |
| Potato-glucose-agar | Dark greenish grey or dark purple grey. | Cottony, brownish white. | Dark. |
| Synthetic medium (liquid) | Superficial growth: colorless, grey to reddish brown with greyish tinge. Submerged growth; colorless. | Thick, powdery, white. | Light yellowish brown. |
| Glucose-nutrient broth | Ring growth: dark brown. Submerged growth; colorless to grey. | Powdery, greyish white. | Reddish brown, dark reddish brown. |
| Nutrient broth | Colorless, greyish white to brown. No ring growth. | ...do... | Dark reddish brown. |
| Gelatin stab (20° C.) | Colorless to dark brown. | White to grey. | Light yellowish brown. |
| Milk medium | Ring growth: cream color to dark brown. | None. | Pinkish brown. |
| Löffler's serum medium (37° C.) | Yellowish grey, brownish grey to dark olive grey. | | Dark brown. |
| Blood agar (37° C.) | Glossy, yellowish grey, brownish grey to dark olive grey. | | Do. |
| Potato plug | Wet, wrinkled, colorless, greyish yellow-brown to yellowish brown. | Brownish white to greyish white. | Dark yellowish brown. |
| Carrot plug | Spotted colonies, wrinkled thin. Colorless, yellowish grey, brownish grey to greyish brown. | Powdery, greyish white to brownish white. | Yellowish brown. |

NOTE.—Culture temperature is 27° C., unless otherwise mentioned. (2) Color of soluble pigment in parenthesis is observed at the time of isolation. Color changed later. (3) Observation was made for 3 weeks.

TABLE 4
Comparison of Streptomyces melanogenes with Streptomyces carzinomycicus and Streptomyces kitazawaensis

| | | Streptomyces carzinomycicus | Streptomyces kitazawaensis | Streptomyces melanogenes |
|---|---|---|---|---|
| Spiral of aerial mycelia | | With spirals [1] | none | none |
| Synthetic agar | Growth | | Cream color to yellow [1] | White to reddish brown with greyish tinge. |
| | Aerial mycelium | Light brown or [1] grey with tinge of olive color. | Pale light pink color. | Brownish white. |
| | Soluble pigment | Light yellow. | None. | Yellowish brown. |
| Calcium malate agar | Growth | Yellowish brown [1] | Cream color [1] | Bluish black with greyish tinge. |
| | Aerial mycelium | Olive-grey [1] | White. | Yellowish white. |
| | Soluble pigment | Light purple. | None. | Light yellowish brown. |
| Proteolytic action | Gelatin | | No liquefaction. | Weak liquefaction. |
| | Hemolysis | | | Hemolytic. |
| | Serum agar | | No liquefaction. | Strong liquefaction. |
| Sugar utilization | Xylose | (−) | (+) | (+). |
| | Rhamnose | | (−) | (−). |
| | Raffinose | (+) | (+) | (+). |
| | Maltose | (+) | (−) | (+). |
| | Salicin | | (+) | (−). |

[1] Considered to be important differentiation points.

Streptomyces No. V 1179 was compared with several species which should be differentiated, as described above, and it was found that this strain differs from any one of them. Therefore, this strain which was found by the present inventors was named *Streptomyces melanogenes*, after the name of the anti-tumor substance produced by it.

As this new anti-tumor substance is obtained as a dark brown amorphous powder, and is an acidic melanin-like protein, it was named melanomycin.

*Streptomyces melanogenes* includes the typcial strain V 1179 described above and all natural and certified variants and mutants thereof.

To cultivate this new Streptomyces, *Streptomyces melanogenes*, which produces the new anti-tumor substance melanomycin the following are used as nutritional sources in the fermentation: peptone, meat extract, corn steep liquor, soy bean meal, yeast, urea, ammonium sulfate, or sodium nitrate, etc. as a nitrogen source; starch, glucose, lactose, glycerine, maltose or dextrin, etc. as a carbon source; sodium chloride, potassium chloride, calcium carbonate, potassium phosphate, ferrous sulfate, magnesium sulfate or zinc sulfate, etc. as inorganic salts. A liquid medium which contains the above ingredients and is adjusted to about pH 7.0–7.5 is used for fermentation. Of these nutritional sources, one or more can be contained in the fermentation medium, and, of course, the yield of melanomycin varies with the ingredients to some extent. In many experiments, the media which contained an appropriate amount of glycerine, starch or glucose as a carbon source and peptone, meat extract, yeast, or soy bean meal as a nitrogen source and sodium chloride and calcium carbonate was found to be good.

In the submerged, aerobic fermentation of the organism to produce melanomycin, the carbohydrate solution used contains as a source of carbon a commercially available sugar, other carbohydrate or glyceride oil and as a source of nitrogen inorganic salts such as ammonium sulfate and sodium nitrate and organic materials, often in crude form, such as corn steep liquor, distillers solubles, yeast soybean meal and when desired mineral salts and buffering agents such as calcium carbonate; such medium ingredients include those listed in Canadian Patent 513,324 and in British Patents 736,325 and 730,341 and in U.S. Patents 2,691,618, 2,658,018, 2,653,899, 2,586,762, 2,516,080, 2,483,892, 2,609,329 and 2,709,672.

Culture broth, when such is to be employed as the raw material for the process of present invention, may be prepared by inoculating the spores or the culture of a suitable melanomycin-producing strain, e.g. a strain of *Streptomyces melanogenes*, in a nutrient medium and cultivating under aerobic conditions. As the nutrient source, a nitrogen source such as soy bean meal, corn steep liquor, meat extract, peptone, soy bean oil cake, yeast, rice bran, wheat bran, cottonseed meal, peanut meal, sodium nitrate, nitrate and ammonium salts and a carbon source such as a carbohydrate, e.g. fructose, sucrose, maltose, starch and glucose, or a polyhydric alcohol, e.g. glycerol, are employed. Various metal ions may be added in minute or trace quantity if desired. Any substance that can be used for the cultivation and can be assimilated or utilized by melanomycin-producing organisms may be employed. Cultivation on solid medium is possible but for the production in large quantity cultivation in liquid medium is preferable. The temperature of cultivation may be varied in a wide range, e.g. 25° C.–35° C., within which the organism may grow and the active substance may be produced but about 28° C. is particularly preferable. Generally cultivation is continued until sufficient quantity of the melanomycin is accumulated in the medium and requires at least 12 hours and preferably 2–5 days.

Melanomycin-producing strain is inoculated to such a medium. Both surface and submerged culture methods can be used, but usually the latter is preferable. Cultivation is carried out for 1–5 days at 24° C.–30° C., aerating and agitating. In general, tumor cells in ascites of mouse, which were inoculated with about 1,000 Ehrlich carcinoma cells intraperitoneally, disappear on the next day after single intraperitoneal injection of 0.1 cc. of culture medium cultivated for 1–2 days. Cultivation is stopped when anti-tumor potency reaches a maximum. Culture filtrate, which is obtained by removing mycelia from the culture medium and contains melanomycin chiefly, is adsorbed on anion and cation exchange resins at pH 2–9. The resins are washed with water and melanomycin is eluted from the resins by alkaline solutions such as sodium hydroxide, ammonia, etc. A black precipitate of melanomycin is obtained by saturating the extract with ammonium sulfate, or adding precipitating agents such as calcium chloride, zinc chloride, etc., or by adjusting pH to 2–6 with hydrochloric acid or acetic acid. The extract is cooled to complete precipitation.

Melanomycin is conveniently recovered in purified and concentrated form from aqueous solutions, including fermentation broths per se or after removal of the mycelium by filtration, by adsorption on and subsequent elution from ion exchange resins.

The absorption is carried out at pH 2 to 7 in the case of cation exchange resins. Among these, resins having carboxylic acid groups are preferred to those having sulfonic acid groups as the active group. Elution from the former resins is easier than from the latter. Examples of such cation exchange resins are described in U.S. Patents 2,319,359, 2,333,754, 2,340,110, 2,340,111, 2,528,188 and 2,541,420. Use may be made of a commercially available resin such as Amberlite 1RC–50, which is a carboxylic type copolymer of methacrylic acid and divinyl benzene, preferably in the hydrogen ion cycle.

Absorption is carried out at about pH 7 to 9 in the case of anion exchange resins and use is made, e.g. in the chloride form, of anion exchange resins such as Amberlite 1R–4B which is a commercially available weakly basic anionic exchange resin of the type described in U.S. Patent 2,591,573.

After such adsorption on a resin, melanomycin is eluted by passage through the resin column of aqueous bases such as ammonium hydroxide or sodium hydroxide. The melanomycin can then be recovered from the aqueous eluate in various ways, e.g. by adjusting the pH to about the range of 3.0 to 5.0 to precipitate the melanomycin.

Being amphoteric, melanomycin forms metal salts, e.g. upon treatment of an aqueous solution with one equivalent of sodium hydroxide, potassium hydroxide or calcium hydroxide to form sodium melanomycin, potassium melanomycin or calcium melanomycin respectively. There are thus formed salts with alkali metals or alkaline earth metals or other metals such as magnesium, iron and aluminum; such heavy metals normally produce water-insoluble salts of value in isolation procedures. Because of its amphoteric nature, melanomycin also forms acid addition salts (upon treatment with one equivalent of acid) with such organic and inorganic acids as sulfuric acid, hydrochloric acid, hydrobromic acid, hydriodic acid, phosphoric acid, citric acid, maleic acid, malic acid, tartaric acid, benzoic acid, cinnamic acid, ascorbic acid, acetic acid, picric acid, phytic acid, sulfamic and mandelic acid. For therapeutic purposes use is made of salts of non-toxic acids but salts of toxic acids, e.g. picric acid, are useful in isolation procedures, e.g. as precipitants from aqueous solutions.

The precipitate is then collected, washed with water at pH 2–6 several times, adjusted to pH 8.0 with sodium chloride solution, and dissolved in water. This solution is dialyzed using a semi-permeable membrane and running water for 1–2 days; then the inner solution is freeze-dried to obtain melanomycin as a dark brown purified powder.

As described above, the present inventors obtained the sodium salt of a new anti-tumor substance melanomycin, which is easily soluble in water, by cultivating a new streptomyces, *Streptomyces melanogenes*, by purifying and concentrating the culture filtrate using ion exchange resin, and by precipitating the active agent making use of ammonium sulfate saturation or a precipitation agent such as zinc chloride, calcium chloride, etc., or by precipitation at isoelectric point.

Melanomycin which was obtained by such procedures has the following nature:

(1) Tasteless, dark brown, amorphous amphoteric substance.
(2) Sparingly soluble in acidic water (pH 2–5), but easily soluble in alkaline water (pH 6–9). Insoluble in organic solvents. Soluble in hydrochloric-acid acidic methanol or alkaline methanol, and in hydrochloric acid acidic or aqueous (more than 10%) ethanol, butanol and acetone, but the potency drops concurrently.
(3) Do not pass through semi-permeable membrane.
(4) Water solution is salted out with ammonium sulfate. Precipitated with protein precipitating agents such as alum, picric acid, flavianic acid, phosphotungstic acid, copper sulfate, zinc chloride, iron chloride, calcium chloride, trichloroacetic acid, sulfosalicyclic acid, etc.
(5) Elementary analysis of purified powder: C, 57.84%; H, 8.11%; N, 6.38%.
(6) Ultraviolet absorption spectrum of solution in 1/10 N hydrochloric acid and in 1/10 N sodium hydroxide; no particular absorption band, except slight shoulder at 270–275 mu.
(7) Adsorbed on and eluted from both cation and anion exchange resins.
(8) Color reaction: Negative biuret, ninhydrin, Fehling, Sakaguchi reactions. Positive diazo, xanthoprotein, Millon, nitroprusside reactions. Decolorized by bromine, chlorine, potassium permanganate, hydrogen peroxide, etc. Change to reddish brown by concentrated alkali or concentrated hydrochloric acid.
(9) On hyrolysis with 6 N hydrochloric acid for 12 hours, degradate becomes ninhydrin positive, indicating the existence of amino acids. Of amino acids, phenylalanine, leucine, valine, proline, alanine, lysine, arginine, glutamic acid and histidine (but not tyrosine) were confirmed to be present in the hydrolysate.
(10) On electrophoretic chromatography of a solution of this substance using buffered solutions it moved towards cathode at pH 1.0, towards anode at pH 5.0 or above 5.0 but showed no movement at pH 2.0–4.0. Therefore it was found that the isoelectric point of this substance lies between pH 2 and 4.
(11) The antibiotic activity of this substance against various Gram positive and negative bacteria, streptomyces, fungi and yeast tested by the agar dilution method is indicated in Table 5.

TABLE 5

*Antibiotic Spectrum*

| Test organisms | Minimum concentration for complete inhibition (mcg. per 1 cc. of medium) |
|---|---|
| *Micrococcus pyogenes* var. *aureus*, 209 Strain | >3,200 |
| *M. pyogenes*, var. *albus* | >3,200 |
| *Streptococcus pyogenes hemolyticus*, Cook Strain | 1,600 |
| *Diplococcus pneumoniae*, Type I | 200 |
| *Corynebacterium diphtheriae* | 3,200 |
| *Hemophilus pertussis*, Original Strain L | >3,200 |
| *Hemophilus pertussis*, Sakairi Strain | >3,200 |
| *Escherichia coli* | >3,200 |
| *Klebsiella pneumoniae*, ATCC 602 | >3,200 |
| *Salmonella typhosa* | >3,200 |
| *Salmonella paratyphi* A | >3,200 |
| *Shigella dysenteriae*, Shiga | >3,200 |
| *Bacillus subtilis*, PCI 219 Strain | >3,200 |
| *Bacillus anthracis* | >3,200 |

TABLE 5—Continued

| Test organisms | Minimum concentration for complete inhibition (mcg. per 1 cc. of medium) |
|---|---|
| *Mycobacterium phlei* | >3,200 |
| *Mycobacterium 607* | 1,600 |
| *Nocardia asteroides* | 1,600 |
| *Trichophyton interdigitale* | >3,200 |
| *Cryptococcus neoformans* | >3,200 |
| *Aspergillus niger* | >3,200 |
| *Penicillium chrysogenum*, Q176 | >3,200 |

(12) Stability: The potency of solutions of this substance is 50% decreased by heating at 100° C. for 10 minutes, but no potency decrease was noticed after incubation at 37° C. for 1 hour or after 24 hour storage at pH 4 and 0° C.
(13) Hemolysis: Non-hemolytic to horse blood corpuscles at below 62.5 mcg./ml., but hemolytic at 125 mcg./ml. or more.
(14) Anti-tumor effect: DD mice, weighing 18–20 g., are inoculated with 10 million Ehrlich carcinoma cells intraperitoneally, and this substance is injected intraperitoneally 6 hours after the inoculation. Ascites is taken 15–17 hours after the inoculation, and the percentage of carcinoma cells in a smear preparation is counted. The amount of melanomycin which was necessary to depress the percentage carcinoma cells below 1% was 75–250 mcg. The prolongation of the survival period by a single injection of melanomycin of twice as much as the required amount described above is 8.5 days longer than the control. Effect on the subcutaneous Ehrlich tumor: DD mice, weighing 18–22 g., were inoculated with 1 million Ehrlich carcinoma cells, and 7 day treatment with this substance was started from the next day. The animals were sacrificed on the 10th day and subcutaneous tumors were weighed. In the case of intraperitoneal injection, the growth of tumors was inhibited to ⅓ by 50 mg./kg. injection and to ½ by 25 mg./kg. injection. When the treatment was started 3 days after the inoculation of tumor cells and continued for 7 days, the growth of tumors were inhibited to ¼ by 100 mg./kg. daily injections, and to ⅓ by 50 mg./kg. daily injections. When the treatment started 1 week after the inoculation of tumor cells and continued for 7 days, the growth of tumors were inhibited to ½ by 100 mg./kg. and 50 mg./kg. injections.
(15) Estimation of the anti-tumor potency: The anti-tumor potency of melanomycin was defined as follows: Ten million Ehrlich ascitic carcinoma cells are suspended in 0.2 ml. of physiological saline solution, and inoculated to 18–22 g. mice intraperitoneally. Six hours thereafter, 0.5 ml. of the test solutions which were diluted to several different concentrations are injected intraperitoneally. After 15–17 hours, ascites is taken from the mice, smeared and fixed to make Giemsa-stained preparations. The preparation is observed under the microscope (800 times magnification). The potency of the testing solution is defined as 5 units when 1–2 tumor cells, in a microscopic field are observed on the average of several fields.
(16) Toxicity: Safe doses of single injections of melanomycin are: 125 mg./kg. intraperitoneally, 50 mg./kg. intravenously, and 250 mg./kg. subcutaneously. Safe doses of once daily injections in consecutive injections for 7 days are: 80–125 mg./kg. intraperitoneally, 20 mg./kg. intravenously, and 200 mg./kg. or more subcutaneously. Toxic effect appeared within 2 days, and no delayed toxicity was noticed.

Melanomycin which was obtained in this invention differs from known anti-tumor substances. Melanomycin resembles carzinomycin (gannmycin) and carzinocidin in their black color, non-permeability through semi-permeable membrane, and weak or no antibacterial activity, but melanomycin differs from the others in following points. Carzinomycin is not absorbed by both anion and cation exchange resins, is not precipitated by precipitating agents other than zinc chloride, and is produced by *Streptomyces carzinomycicus*. Carzinocidin is not adsorbed on and eluted from both anion and cation exchange resins, is not precipitated by precipitating agents other than zinc chloride and phosphotungstic acid, and is produced by *Streptomyces kitazawaensis*. On the contrary, melanomycin is adsorbed on and eluted from both anion and cation exchange resins, is precipitated by not only zinc chloride and phosphotungstic acid but also by majority of other precipitating agents such as iron chloride, copper sulfate, lead acetate and trichloroacetic acid, and is produced by *Streptomyces melanogenes*. Melanomycin differs from other known anti-tumor substances such as actinomycins, sarkomycin, carzinophilin, azaserine, mitomycin, pluramycin, etc., in many points, and the most remarkable difference is that melanomycin is a melanin-like substance and does not pass through a semi-permeable membrane.

Examples will be set forth below. In these examples the processes of the present invention are illustrated by combinations of plural operations. However, it will be understood from the foregoing that the present invention is not limited to such and may also be attained otherwise, e.g. by employing a single operation. After reading the characteristics of the active substance herein disclosed, it will be obvious to those skilled in the art that various variations or modifications which are not concretely described herein may be made to obtain the same results.

EXAMPLE 1

The medium, which consists of 2% glucose, 0.5% peptone, 0.5% meat extract, 0.5% sodium chloride, 0.3% dried yeast and 0.3% calcium carbonate and is adjusted to pH 7.0, is poured (100 ml. each) into 5 shaking culture flasks of 500 ml. capacity and autoclaved at 120° C. for 20 minutes. After cooling, 1 ml. of spore suspension of pure culture of *Streptomyces melanogenes* is inoculated aseptically to each flask, and they are shake-cultured at 28° for 48 hours to obtain inocula for tank fermentation. Twenty liters of medium with the above-described composition is put in a 50 liter stainless steel fermenter, sterilized at 120° C. for 20 minutes, then cooled to 28° C., and 500 ml. of above-described inoculum is inoculated aseptically. After 24 hour fermentation at 28° C., aerating (20 liters per minute aeration) and agitating, mycelia are removed to obtain 20 liters of culture filtrate. (20 l., 25 units/ml., 500,000 units in total). The culture filtrate is adjusted to pH 4.0 with 1 N hydrochloric acid. Then, the active agent is adsorbed on H+ Type IRC 50 cation exchange resin by passage through three connected columns of the resin (500 mm. in length and 54.5 mm. in diameter, 1,168 ml.) at a velocity of 200 ml. per minute. After washing thoroughly with water the active agent is eluted by 1.5 N ammonia water at a velocity of 35 ml. per minute. The eluate is black, 5,900 ml., 50 units/ml., 295,000 units in total; yield 59%. The active substance is obtained as a black precipitate when the eluate is adjusted to pH 3.2. This precipitate is then washed three times with 0.1% acetic acid, dissolved in water at pH 8.0, dialyzed, and freeze-dried to obtain a black powder of sodium melanomycin. 2,300 mg., 40 units/mg., 92,000 units in total. Yield 28%.

EXAMPLE 2

The culture filtrate obtained by the method described in Example 1 (800 ml., 10 units/ml., 8,000 units in total) is adjusted to pH 5.0 with hydrochloric acid and to it is added 1% (8 g.) zinc chloride and the precipitate of melanomycin thus formed is centrifuged and collected. The precipitate is dissolved in water at pH 9.0. 30 ml., 250 units/ml., 7,500 units in total. Yield 94%.

EXAMPLE 3

To the eluate (700 ml., 25 units/ml., 17,500 units in total) which is obtained by the method described in Example 1 absorbing on ion exchange resin and eluting with 1.5 N ammonia water, 175 g. ammonium sulfate is added, and after allowed to stand for 1 hour, the resulting black precipitate of melanomycin is centrifuged. The precipitate is then dissolved in 20 ml. water, and dialyzed in running water for 2 days. The inner solution (35 ml., 500 units/ml., 17,500 units in total) is freeze-dried to obtain melanomycin as a dark brown powder. 500 mg., 30 units/mg., 15,000 units in total. Yield 86%.

EXAMPLE 4

The eluate (700 ml., 25 units/ml., 17,500 units in total) which is obtained by the method as described in Example 1 and eluated with 1.5 N ammonia water from ion exchange resin, is adjusted to pH 6.0 with 0.1 N sodium hydroxide solution, added to 34.5 ml. of 50% zinc chloride solution, kept at 0° C., for two hours, and the black precipitate of melanomycin thus formed is centrifuged. This precipitate is then dissolved in 20 ml. of water and dialyzed in running water for one day. The inner solution (25 ml., 348 units/ml., 8,700 units in total) is freeze-dried to obtain dark brown, powedered sodium melanomycin. 280 mg., 30 units/mg., 8,400 units in total. Yield 48%.

EXAMPLE 5

The culture filtrate (250 ml., 10 units/ml., 2,500 units in total) which is obtained by the method described in Example 1, is adjusted to pH 9.0 and passed through 30 ml. anion exchange resin, IR4B.RCl Type, at a velocity of 3 ml. per minute. The filtrate contained 650 units (24%). After washing with water, the resin is eluted with 1 N ammonia water. The eluate up to pH 9.0: 30 ml. Total units: 1,200 units (40 units/ml.). Yield 52%.

EXAMPLE 6

Twenty liters of the medium which consists of 2% starch, 1% soy bean meal, 0.2% monopotassium phosphate, 0.2% sodium chloride, 0.001% ferrous sulfate, and 0.3% calcium carbonate is put in a 50 liter stainless steel fermenter, adjusted to pH 7.2 with sodium hydroxide, and sterilized at 120° C. for twenty minutes. After cooling to 28° C., 500 ml. of the inoculum, which is obtained by the method described in Example 1, are added aseptically. Fermentation is carried out at 28° C. for 40 hours, aerating (20 liters per minute) and agitating to obtain 50 units per ml., 1,000,000 units in total. After cooling and removing mycelia, the culture filtrate is adjusted to pH 5.0, and there is added 200 g. zinc chloride. The black precipitate of melanomycin thus obtained is collected by centrifugation as black crude powder, 90 g., 10 units/mg., 900,000 units in total. This crude powder is suspended in 400 ml. of water and dissolved in the water by adjusting the pH of the suspension to 8.0 with sodium hydroxide. This solution (500 ml., 1,800 units/ml.) is passed through a 500 ml. column of H+ Type IRC 50 ion exchange resin for adsorption. The potency of the filtrate was 200 units per ml. Next, the resin column was eluted with 500 ml. of 1 N ammonia water to obtain 400 ml. eluate with a potency of 1,500 units per ml. (600,000 units in total). Yield 60%. To this eluate, acetic acid was added to adjust the pH to 3.0 and to precipitate melanomycin. The precipitate was washed with water, vacuum-dried and 20 g. powder was obtained. 25 units/mg., 500,000 units in total. Yield 50%.

We claim:

1. A process for producing melanomycin which comprises cultivating a strain of *Streptomyces melanogenes* in an aqueous carbohydrate solution containing an organic nitrogenous nutrient under submerged aerobic conditions for at least twelve hours and then recovering melanomycin from said solution.

2. A process of producing melanomycin which comprises cultivating a strain of a member selected from the group consisting of Streptomyces A.T.C.C. 12851 and Streptomyces A.T.C.C. 12852 in an aqueous carbohydrate solution containing an organic nitrogenous nutrient under submerged aerobic conditions for at least twelve hours and then recovering melanomycin from said solution.

3. A process according to claim 2 wherein the melanomycin is recovered from the fermentation broth by precipitation by a protein-precipitating reagent.

4. A process according to claim 2 wherein the melanomycin is recovered from the fermentation broth by adsorption on an ion exchange resin and subsequent elution therefrom.

5. A new biologically active substance identified as melanomycin, which is prepared by the process of claim 2 and is a brown protein-like amphoteric substance which is sparingly soluble in water at pH 2 to 5 but soluble in water at pH 6 to 9, is insoluble in organic solvents, does not pass through a semi-permeable membrane upon dialysis, exhibits essentially no maxima of absorption of ultra-violet light between 270 and 330 m$\mu$, exhibits negative biuret, ninhydrin, Fehling and Sakaguchi reactions and positive diazo, xanthoprotein, Millon and nitro-prusside reactions, is decolorized by bromine, chlorine, potassium permanganate and hydrogen peroxide, yields on acid hydrolysis phenylalanine, leucine, valine, proline, lysine, arginine, alanine, glutamic acid and histidine and exhibits an iso-electric point between pH 2 and 4.

References Cited in the file of this patent

UNITED STATES PATENTS 2,649,401   Haines _____ Aug. 18, 1953

OTHER REFERENCES

Waksman: Soil Science, 7 (2): 1919.

Waksman, Soil Science, vol. 8, No. 2, 1919, pp. 138–140.

Grundy: Antibiotics and Chemotherapy 1 (5); 309–317, 1951.

Okami et al.: Japanese Med. J. 1:87–90, 1953.

Harada et al.: J. Antibiotics, Series A9(3), 113–117, 1956.

Hosoya: Chemotherapy (Japanese) 3(4), 128–131, 1955.

Pridham et al.: Antibiotics Annual, 1956–1957, pp. 947–953.

Sneath: J. Gen. Microbiol., vol. 17, pp. 184–185, 1957.

Sugawara et al.: J. Antibiotics, Series A, pp. 133–142, July 1957.

J. Bacteriology, October 1956, p. 4, Instructions to Authors.

UNITED STATES PATENT OFFICE
CERTIFICATE OF CORRECTION

Patent No. 3,067,100              December 4, 1962

Toju Hata et al.

It is hereby certified that error appears in the above numbered patent requiring correction and that the said Letters Patent should read as corrected below.

Columns 3 and 4, TABLE 1, under the heading "Growth", line 7 thereof, for "idented" read -- indented --; same TABLE 1, in the footnote, for "NOTE.—Culture" read -- NOTE.— (1) Culture --; column 4, TABLE 2, line 1 thereof, for "Loffler's" read -- Löffler's --; same column, TABLE 3, first column, line 1 thereof, for "Xylose" read -- Xylose --; column 7, line 40, for "hyrolysis" read -- hydrolysis --; column 10, line 8, for "absorbing" read -- adsorbing --; line 21, for "eluated" read -- eluted --.

Signed and sealed this 13th day of August 1963.

(SEAL)
Attest:

ERNEST W. SWIDER
Attesting Officer

DAVID L. LADD
Commissioner of Patents